July 25, 1939.  B. M. KAY  2,167,076

SIGNALING APPARATUS

Filed Jan. 18, 1938  2 Sheets-Sheet 1

Inventor

Byron M. Kay

By Clarence A. O'Brien
Hyman Berman

Attorneys

July 25, 1939.   B. M. KAY   2,167,076
SIGNALING APPARATUS
Filed Jan. 18, 1938   2 Sheets-Sheet 2
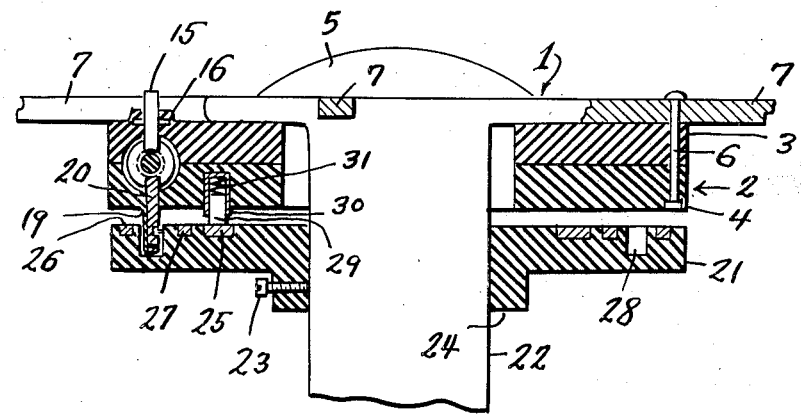
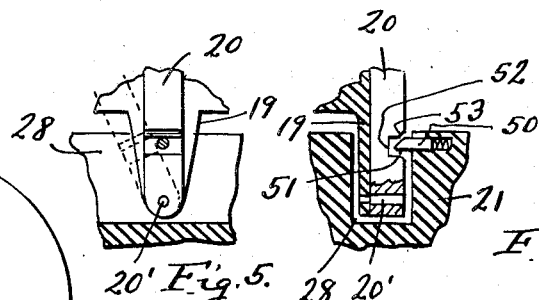
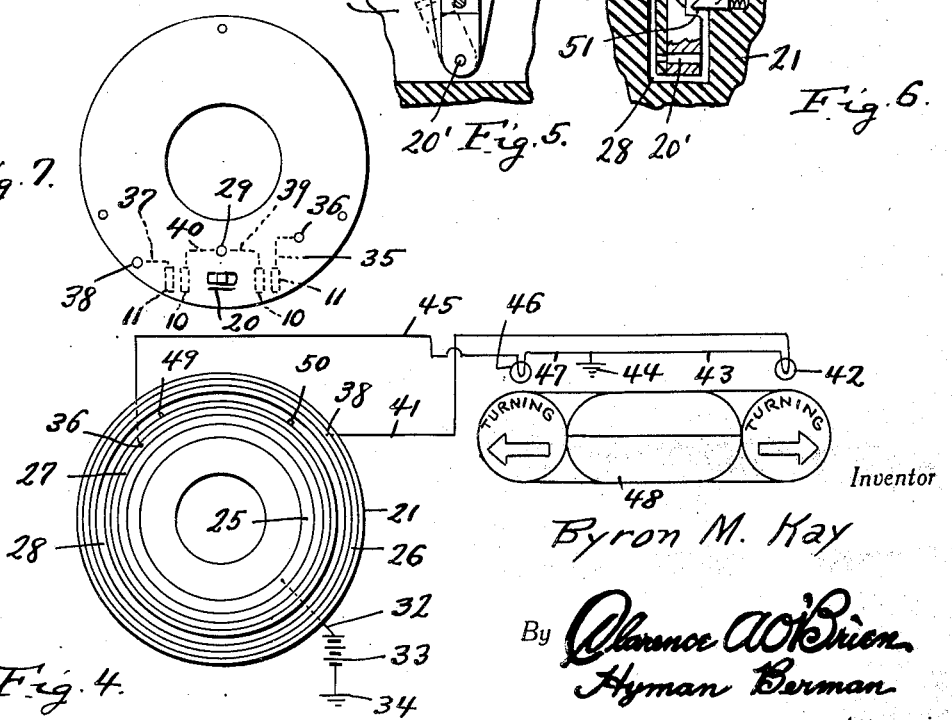
Inventor
Byron M. Kay
By Clarence A. O'Brien
Hyman Berman
Attorneys Patented July 25, 1939

2,167,076

UNITED STATES PATENT OFFICE 2,167,076

SIGNALING APPARATUS

Byron M. Kay, Tulsa, Okla.

Application January 18, 1938, Serial No. 185,600

2 Claims. (Cl. 200—59)

My invention relates to improvements in right and left turn signaling apparatus for automobiles and the primary object of the invention is the provision of a practical, efficient apparatus of this character for signaling right and left turns selectively before the turns are made and automatically obliterating the signal after the turn is made.

Another object is to provide apparatus of the character and for the purpose above set forth in which the signal is obliterated under control of the steering wheel, as for instance, when said wheel is turned to again direct the vehicle in a straight course.

Still another object is to equip an automobile with apparatus adapted for the purposes above indicated and without extensive alteration of the basic equipment of the automobile.

Other, and subordinate objects are also comprehended by my invention all of which together with the precise nature of my improvements will be readily understood when the following description and claims are read with reference to the drawings accompanying and forming part of this specification.

In said drawings:—

Figure 1:
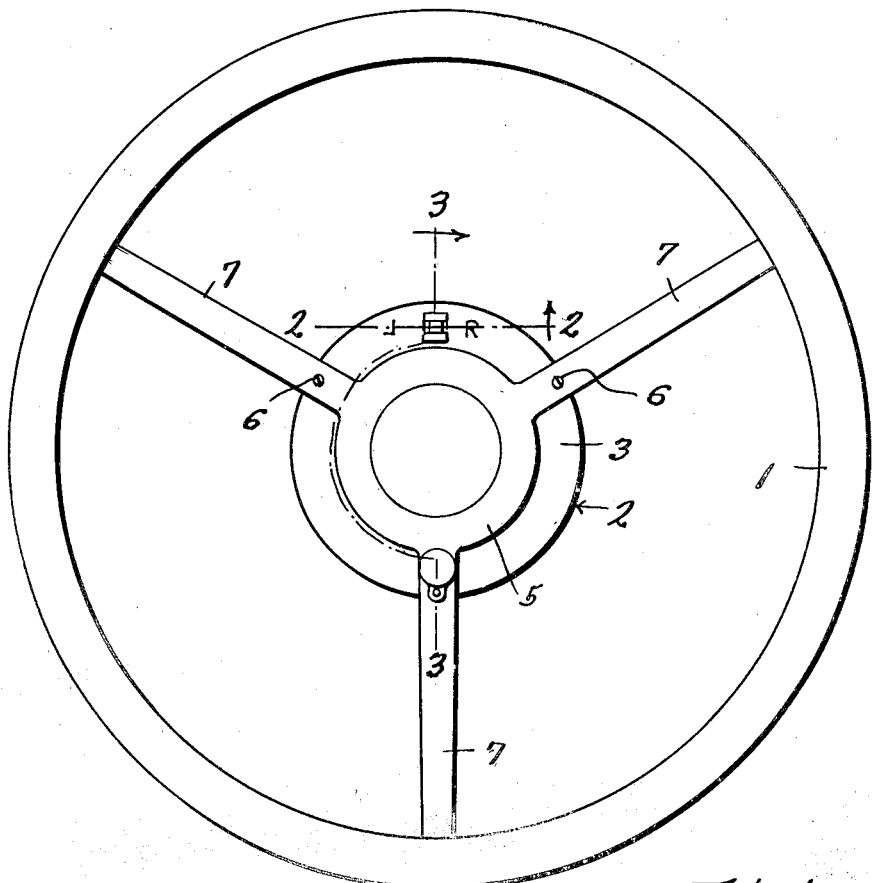
Figure 2:
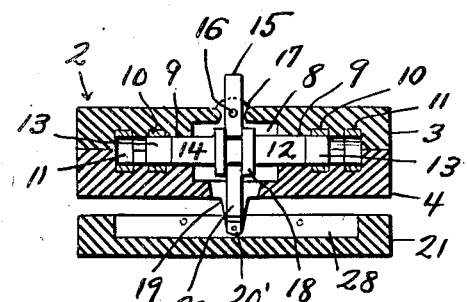

Figure 1 is a view in top plan of a steering wheel and parts of the apparatus carried thereby, Figure 2 is a view in transverse section taken substantially on the line 2—2 of Figure 1 looking in the direction indicated by the arrows and drawn to an enlarged scale, Figure 3 is a similar view taken on the line 3—3 of Figure 1 looking in the direction indicated by the arrows, Figure 4 is schematic view illustrating diagrammatically the circuits, Figure 5 is a detailed fragmentary view partly in section and partly in rear elevation taken substantially on the same line as Figure 2 but illustrating the parts drawn to a further enlarged scale, Figure 6 is a similar view taken at a right angle to Figure 5, and Figure 7 is a view in bottom plan of the switch housing.

Referring to the drawings by numerals, according to my invention the steering wheel 1 of the automobile has mounted on the under side thereof an annular switch housing, or casing, 2 comprising a pair of upper and lower flat annular sections 3 and 4 of suitable insulating material secured together and to the wheel 1 in opposed side by side relation and in surrounding concentric relation to the hub 5 of the wheel by means of bolts 6 passing through the outer edges of the sections 3 and 4 and through the spokes 7 of said wheel. The opposed sides of the sections 3 and 4 are recessed to form conjointly a cylindrical elongated socket 8 extending horizontally across the front of the housing, the ends of the socket 8 being of reduced diameter as shown at 9. Two right and left hand pairs of contacts are secured in opposite ends 9 of socket 8, respectively, each pair comprising an inner and an outer annular contact member, 10 and 11, of suitable conducting metal secured in the socket 8 concentrically thereof and spaced longitudinally therein.

A plunger switch member 12 is slidably mounted at its ends in the ends 9 of the socket 8 for setting from an intermediate position in opposite directions, respectively, to bridge the right and left hand pairs of contacts 10 and 11 respectively. In the intermediate position thereof, as shown in Figure 2, said plunger 12 engages the inner contact members 10. The ends of the plunger 12 are of suitable conducting metal and the intermediate portion 14 of insulation material. The plunger 12 is settable in opposite directions by means of a thumb lever 15 pivoted intermediate its ends, as at 16, on the upper section 3 and extending through a slot 17 therein into the socket 8 between a pair of collars 18 on said plunger, the arrangement being such that said lever is movable from right to left and vice versa in the setting operation. The device so far described forms a rotatable contact carrier on the wheel 1 and including a settable plunger switch as will be clear. The lower section 4 is provided, in vertical alignment with the pivot 16, with a depending ear 19 to which an upstanding resetting lever 20 is pivoted at its lower end, as at 20', with its upper end disposed between the collars 18. The purpose of the resetting lever 20 will presently be set forth.

Below the housing 2 is an annular fixed contact carrier 21 of insulation material having the form of a flat annulus of the same size as the housing 2 fixed to the steering post 22 in spaced relation to the section 4 and by means of a set screw 23 passing through a hub 24 on said carrier. Imbedded in the upper face of the carrier 21, flush with said face and concentric to said carrier, are three spaced apart contact rings, to wit, an inner ring 25, an outer ring 26 and an intermediate ring 27. Intermediate the rings 26 and 27 a circular concentric groove 28 is provided in the upper face of the carrier 21 into which the beforementioned resetting lever 20 extends for a purpose presently explained.

Depending from the section 4 is a cylindrical shoe 29 sliding in a cylinder 30, imbedded in said section, and urged by a tension spring 31, in said cylinder, into engagement with the inner contact ring 25. Current is fed to the ring 25 by a lead 32 from the ignition battery 33 of the automobile and which is grounded as at 34.

The outer member 11 of the right hand pair of contact members 10 and 11 is connected by a lead 35 to a shoe 36 similar to shoe 29 and similarly mounted in section 4 to engage the intermediate contact ring 27. The outer member 11 of the left hand pair of contact members 10 and 11 is similarly connected by a lead 37 to another shoe 38 similar to shoes 29 and 36 and similarly mounted in section 4 to engage the outer contact ring 26. The inner members 10 of the right and left hand pairs of contact members are connected by leads 39 and 40, respectively, to the shoe 29. The leads 35, 37, 39 and 40 are imbedded in the section 4. The outer contact ring 26 is wired by a lead 41 to one side of a right turn signal light 42, the other side of which is connected by a ground wire 43 to ground 44. The intermediate contact ring is similarly connected by a lead 45 to one side of a left turn signal light 46, the other side of which is grounded by the ground wire 47. The lights 42 and 46 form part of a signal assembly, such as represented at 48, attached to the rear end of the automobile in any suitable manner.

As will now be seen movement of the thumb lever 15 toward the right moves the plunger 12 or sets the same in a left hand position thereby bridging the left hand pair of contacts 10 and 11 whereby circuit is closed to the right signal light 42 from battery 33 by way of lead 32, ring 25, shoe 29, lead 40, plunger 12, members 10 and 11 of the left hand pair, shoe 38, ring 26, lead 41 and ground wire 43. On the other hand when the thumb lever is moved toward the left the plunger is set in a right hand position bridging the pair of right hand contacts 10 and 11 thus closing the circuit to the left signal light 46 from the battery 33 by way of lead 32, ring 25, shoe 29, lead 39, plunger 12, members 10 and 11 of the right hand pair, lead 35, shoe 36, ring 27, lead 45 and ground wire 47.

The plunger 12 is returned to intermediate position from either setting thereof and the signal obliterated by means of the following.

The resetting lever 20, as will be manifest, under setting of the plunger 12 in either direction is swung, or set, on its pivot 20' in a corresponding direction from an intermediate position. Under return movement of the steering wheel 1 from a right or left turn position said resetting lever 20 is returned to intermediate position by means of a pair of spring pressed plungers, or tappets, 49 and 50 extending from the inner wall of the groove 28 and having cam outer ends 51. The plungers 49 and 50 in the normal, or straightway, position of the wheel 1 and parts carried thereby are located upon opposite sides of the resetting lever 20 as shown in Figure 4. Said lever 20 is provided on its inner face with a transverse groove 52 having an upper cam edge 53. The groove 52 and cam 53 are so arranged that under turning of the wheel 1 from normal position in either direction one or the other of the plungers 49 or 50, as the case may be, is cammed inwardly by cooperation of the cam edge 53 with the cam end 51 of the plunger and the lever 20, in its set position, permitted to pass whichever plunger is concerned. As soon as said lever 20 passes the plunger the latter snaps outwardly into the path of return movement of the lever 20 so that on the return of the wheel 1 to normal position said lever engages said plunger and is swung thereby back into intermediate position. In its intermediate position the plunger, 49 or 50, concerned is aligned with the groove 52 and the lever permitted to pass the plunger as the wheel 1 reaches normal position or approximately such position.

The operation of my invention having been fully set forth in the foregoing, in connection with the description of the structure, no further explanation thereof is thought to be required.

Manifestly, the invention as described is susceptible of modification without departing from the inventive concept and right is herein reserved to all modifications falling within the scope of the subjoined claims.

What I claim is:

1. A switch mechanism for use on the steering wheel and steering post of an automobile and for selectively energizing the right and left signal lights of the automobile, comprising an annular housing adapted to be attached to said wheel in surrounding relation to said post, a manipulative plunger in said housing settable endwise therein in opposite directions from a neutral position to energize said right and left lights, respectively, a pair of contacts in said housing at each end of said plunger closed by the latter in the opposite settings thereof, respectively, and means to return said plunger to neutral position adapted for attachment to said post and operative under turning of said wheel in opposite directions, respectively.

2. A switch mechanism for use on the steering wheel and steering post of an automobile and for selectively energizing the right and left signal lights of the automobile comprising an annular housing adapted to be attached to said wheel in surrounding relation to said post, a manipulative plunger in said housing settable endwise therein in opposite directions from a neutral position to energize said right and left lights, respectively, during turning movement of said wheel in opposite directions from normal position, and means to return said plunger to neutral position from either setting thereof adapted for operation under turning of said wheel back to normal position in either direction and comprising a resetting lever depending from said plunger, a pair of tappets, means to mount said tappets on the steering post of said wheel for engagement by said lever under turning of said wheel from normal in opposite directions, respectively, said tappets normally projecting into the path of movement of said lever and being retractable out of the path of movement of said lever by engagement of the latter therewith under turning of said wheel from normal position.

BYRON M. KAY.